(12) United States Patent
George et al.

(10) Patent No.: US 9,594,900 B2
(45) Date of Patent: Mar. 14, 2017

(54) ISOLATING APPLICATIONS HOSTED BY PLUG-IN CODE

(75) Inventors: Sam George, Kenmore, WA (US); Akhilesh Kaza, Sammamish, WA (US); Michael R. Harsh, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1630 days.

(21) Appl. No.: 12/330,528

(22) Filed: Dec. 9, 2008

(65) Prior Publication Data

US 2010/0146379 A1  Jun. 10, 2010

(51) Int. Cl.
*G06F 17/00* (2006.01)
*G06F 21/53* (2013.01)

(52) U.S. Cl.
CPC ...... *G06F 21/53* (2013.01); *G06F 2221/2149* (2013.01)

(58) Field of Classification Search
CPC .................................................. G06F 21/53
USPC ........................................................ 715/234
See application file for complete search history.

(56) References Cited

U.S. PATENT DOCUMENTS

| 6,028,605 | A | * | 2/2000 | Conrad | ............. | G06F 17/30696 |
| | | | | | | 707/999.003 |
| 6,085,224 | A | * | 7/2000 | Wagner | ................... | H04L 29/06 |
| | | | | | | 709/203 |
| 6,253,228 | B1 | * | 6/2001 | Ferris | .................... | G06F 9/4443 |
| | | | | | | 707/999.202 |
| 6,691,230 | B1 | * | 2/2004 | Bardon | ................... | G06F 9/468 |
| | | | | | | 717/116 |

(Continued)

FOREIGN PATENT DOCUMENTS

| JP | 2000148649 A | 5/2000 |
| WO | 2005116804 A2 | 12/2005 |

OTHER PUBLICATIONS

Reis, Charles, "Improving the Security and Robustness of Modern Web Browsers", retrieved at <<http://www.cs.washington.edu/homes/creis/publications/generals-report.pdf>>, pp. 1-15.

(Continued)

*Primary Examiner* — Laurie Ries
(74) *Attorney, Agent, or Firm* — Timothy Churna; Dan Choi; Micky Minhas

(57) ABSTRACT

Described is a technology in which one application running in a browser can host another application (e.g., an advertisement) in an isolated manner that prevents the hosted application from accessing browser data, or data of any other hosted application (including the host). The host and/or hosted application may be a browser plug-in (e.g., Microsoft® Silverlight™) application. The host application privately instantiates a hidden plug-in, with that hidden plug-in's access to browser data disabled, and loads the hosted application in the hidden plug-in. A XAML tag element may be used to identify the hosted application, along with a rendering area for the hosted application. Content from the hosted application is composited with content from the host application when rendering. The host application may provide keywords to the hosted application, such as for selecting relevant advertisements, and/or may allow the hosted application to open a browser window to display associated website content.

20 Claims, 3 Drawing Sheets

(56) References Cited

U.S. PATENT DOCUMENTS

| | | | |
|---|---|---|---|
| 7,020,843 B2* | 3/2006 | Hamlett | G06F 9/4443 709/217 |
| 7,343,625 B1* | 3/2008 | Zaidi et al. | 726/25 |
| 7,950,071 B2* | 5/2011 | Jeong | A41B 11/00 2/239 |
| 2002/0007393 A1* | 1/2002 | Hamel | 709/203 |
| 2003/0079052 A1* | 4/2003 | Kushnirskiy | G06F 9/4425 719/328 |
| 2003/0101292 A1* | 5/2003 | Fisher et al. | 709/328 |
| 2003/0135504 A1* | 7/2003 | Elvanoglu et al. | 707/100 |
| 2005/0257265 A1 | 11/2005 | Cook et al. | |
| 2006/0070056 A1 | 3/2006 | Watson et al. | |
| 2007/0011199 A1 | 1/2007 | Hunt et al. | |
| 2007/0118900 A1 | 5/2007 | Focke et al. | |
| 2007/0244980 A1* | 10/2007 | Baker et al. | 709/207 |
| 2008/0148298 A1 | 6/2008 | Chatterjee et al. | |
| 2008/0155554 A1 | 6/2008 | Kothari et al. | |
| 2008/0184135 A1 | 7/2008 | Washburn et al. | |
| 2008/0209316 A1* | 8/2008 | Zandstra | 715/700 |
| 2008/0222622 A1 | 9/2008 | Lavoie et al. | |
| 2008/0295074 A1* | 11/2008 | Schneider et al. | 717/120 |
| 2008/0295164 A1* | 11/2008 | Steiner et al. | 726/14 |
| 2009/0271771 A1* | 10/2009 | Fallows | 717/137 |
| 2009/0288098 A1* | 11/2009 | Abd-El-Malek | G06F 17/30864 719/312 |
| 2010/0146523 A1* | 6/2010 | Brigaut et al. | 719/330 |
| 2010/0281357 A1* | 11/2010 | Fu | G06F 9/4445 715/234 |

OTHER PUBLICATIONS

Jonsson, Emil, "Rich Internet Applications for the Enterprise", retrieved at <<http://www.diva-portal.org/diva/getDocument?urn__nbn_se_liu_diva-10466-1_fulltext.pdf>>, pp. 71.

Chatley, et al., "MagicBeans: A Platform for Deploying Plugin Components", retrieved at <<http://chatley.com/articles/cd04.pdf>>, pp. 15.

Whitaker, et al., "Scale and Performance in the Denali Isolation Kernel", retrieved at <<http://www.cs.washington.edu/homes/mar/papers/denali_osdi.pdf>>, pp. 15.

"International Search Report", Jun. 23, 2010, Application No. PCT/US2009/064034, Filed Date Nov. 11, 2009, pp. 11.

"Office Action Received for Japan Patent Application No. 2011-540748", Mailed Date: Jan. 14, 2014, 4 Pages.

"Office Action Received for Japan Patent Application No. 2011-540748", Mailed Date: May 27, 2014, 4 Pages.

"Office Action Received in Japan Patent Application No. 2011-540748", Mailed Date: Sep. 8, 2015, 13 Pages.

* cited by examiner

ISOLATING APPLICATIONS HOSTED BY PLUG-IN CODE

BACKGROUND

Contemporary browsers allow plug-ins, which in general comprise hosted software code that interacts with the hosting browser/application to provide some desired functionality. One such plug-in is Microsoft® Silverlight™, which provides a platform that allows for development and hosting of rich web applications that often include animation, vector graphics and/or media (e.g., audio/video) content playback. A plug-in can host a third party application.

In general, this is related to a significant function of modern application development, namely componentization. A general idea behind componentization is to break up a large application in to smaller components that perform smaller portions of the larger task, are reusable and have a known interface. With componentization comes the ability for external (e.g., second or third) parties to author components for an existing application; for example, one modern web-based incarnation of this concept is a web mashup.

However, when non-first party components are used in an application, such as applications hosted by a plug-in, the trust boundary between the component and the application becomes important. A component should not be able to alter the appearance and functionality of user interface (UI) code, or monitor application data, and so forth unless the hosting application has specifically designed for this and expects it.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which one application running in a browser can host another application in a manner that prevents the hosted application from accessing host application data or the data of any other hosted application. In one aspect, the host application is a browser plug-in (e.g., Microsoft® Silverlight™) application that instantiates another plug-in that is hidden to the browser, and prevents the hosted application from accessing data by instantiating the other plug-in with disabled access to browser/hosted application data (e.g., elements) or other applications data.

In one aspect, a tag element identifies the hosted application within code (e.g., XAML) associated with the host application. A host element is added to the host application's element tree to represent the hosted application. The tag element may specify a rendering area for the hosted application. Content from the hosted application is rendered in conjunction (e.g., composited) with content from the host application.

In one aspect, the hosted application may be an advertisement. The host application may provide keywords to the hosted application, such as corresponding to page content, whereby the hosted application may select a relevant advertisement. The hosted application may be allowed to perform some privileged operations, such as to allow the hosted application to open a browser window to display website content (e.g., bring up a website when the user clicks an advertisement in the hosted application's rendering area).

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards an isolation model in which a first application (e.g., browser plug-in or the like) hosts a second, (typically untrusted, third party) application in an isolated manner. In general, this is accomplished by instancing a separate in-memory plug-in instance, which is unknown to the web browser, to isolate the second application. At the same time, the second application (e.g., advertisement) appears to the computer user be running as part of the hosted application, because, for example, its visible output is rendered along with the visible output of the hosting application. As will be understood, however, the hosted application does not have access to information related to the hosting application or the web browser, unless the hosting application desires to provide some information.

While Microsoft® Silverlight™ (a cross-platform, cross-browser plug-in) is used as an example of a hosting application, it should be understood that any of the examples described herein are non-limiting examples. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and hosting applications in general.

Figure 1:
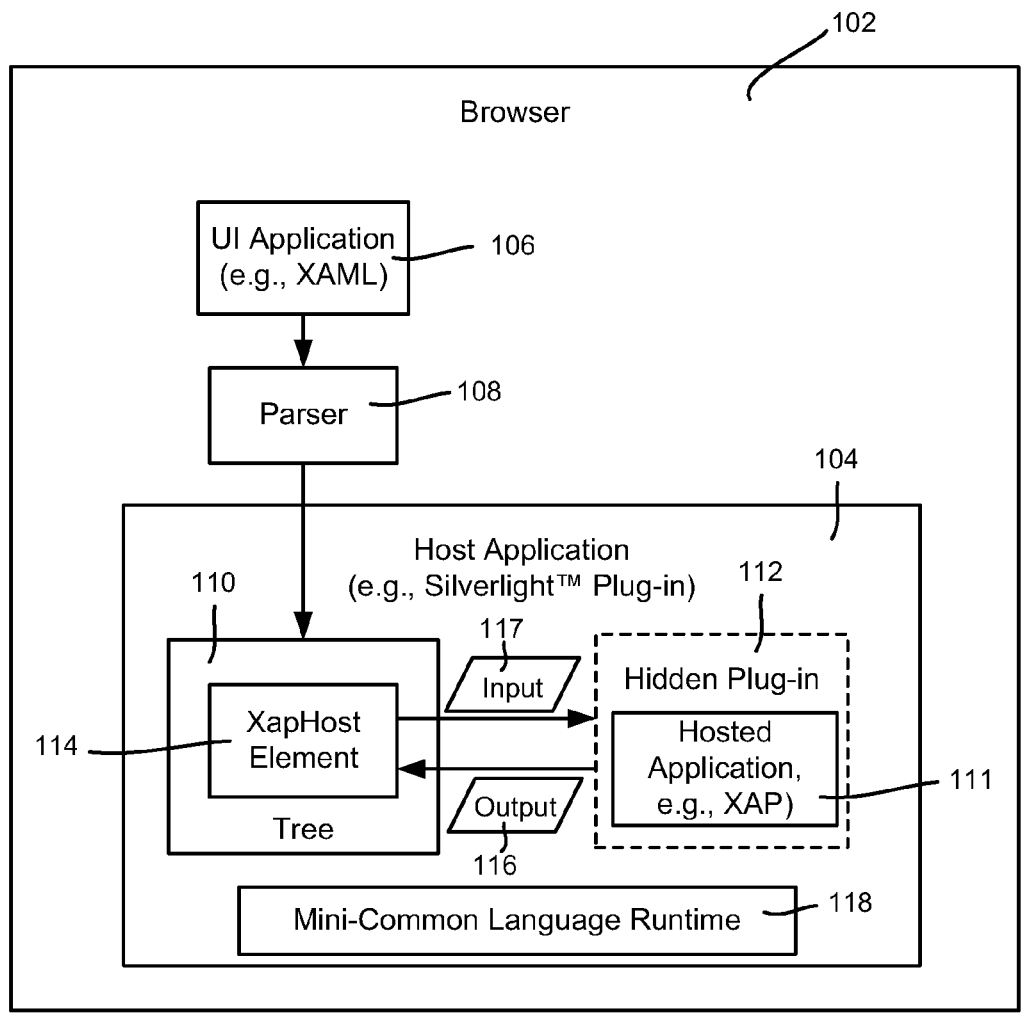
FIG. 1 is a block diagram showing example components for isolating an application hosted by a host (browser plug-in) application.

FIG. 1 shows various aspects related to application isolation as described herein. In general, a browser 102 is loaded with a host application 104, such as a Microsoft® Silverlight™ plug-in. In one implementation, the host application 104 corresponds to user interface application code 106, such as written in XAML (extensible application markup language), which is parsed by a parser 108 into various elements corresponding to a tree 110. As is known, these elements are processed for rendering into the visible output on the browser page.

In one implementation, an application 111 such as a third party advertisement is hosted by the host application 104 as part of a hidden (separate, and undiscoverable to the browser) plug-in 112 in a way that programmatically isolates the hidden plug-in 112 from the browser 102 and from the hosting application's data, yet allows the hosted application 111 to participate in the host application's rendering, input and layout. The rendering, input and layout are managed by the hidden plug-in 112, so that, for example, the visible output is limited to a user interface area that is reserved for the hosted application's output. Note that the hidden plug-in 112 may be another Silverlight™ plug-in, that is, another instance that is privately created (unknown to the browser) by a host Silverlight™ plug-in. Further, note that other types of plug-ins may be used, as long as they can be instantiated or otherwise configured in a manner that prevents them from any direct communication with the HTML browser, e.g., the plug-in is instantiated such that it has no access to the browser Document Object Model (DOM).

To this end, in one example implementation, there is provided a tag element (e.g., in the XAML application code 106) that identifies a source of the hosted application and represents an isolation boundary in which to instance the hidden plug-in 112 for loading the hosted (isolated) application 111:

```
<Canvas> <!-part of the host application -->
    <XapHost Source="http://www.advertisements.com/ad.xap"
    Height="300" Width="350" /> <!-the isolation boundary -->
</Canvas>
```

The tag element is represented in FIG. 1 by the XapHost element 114. Among other operations, the XapHost element 114 is responsible for instancing and initializing the hidden plug-in 112 in memory, in a location that is not discoverable from the browser 102; this may be accomplished via private APIs or the like. The hosted application 111 does not participate in the tree 110 of the host application 104, except via the XapHost element 114 that acts as a proxy to isolate the hidden plug-in 112. For example, the hosted application 111 cannot traverse the tree other than to its own topmost node, which corresponds to the root node of its application. Note that it does not have access to the XapHost element, which resides in the hosting applications tree. Instead, the hosted application 111 is limited to only providing output 116 for rendering via the XapHost element 114, (although the XapHost element 114 may provide additional data such as initialization parameters and/or allow some privileges to the hosted application 111 as described below with reference to FIG. 3). This and any other data communicated from the XapHost element 114 to the hidden plug-in 112/hosted application 111 is represented in FIG. 1 as input 117.

Figure 2:
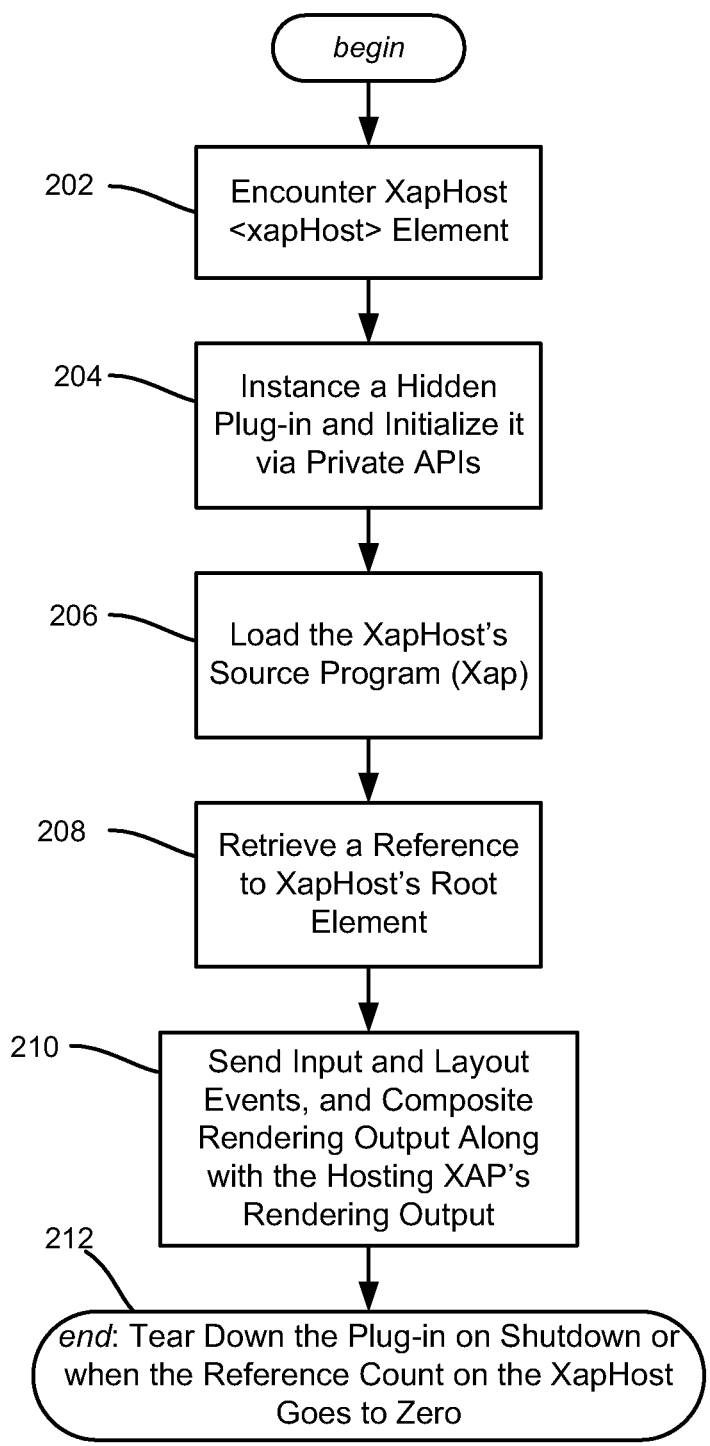
FIG. 2 is a flow diagram showing example steps taken to isolate a hosted application.

As generally represented via the example steps of FIG. 2, when the XAML application code 106 is parsed or when a XapHost element 114 is programmatically added to the tree 110 (step 202), at steps 204 and 206 the XapHost element 114 initializes the hidden plug-in 112 and loads the corresponding hosted application 111 (e.g., XAP) that is specified by the "Source" attribute, (which in the above example XAML language is identified as "http://www.advertisements.com/ad.xap"). The hosted application 111 has no access to the browser's HTML domain object model (e.g., the EnableHtmlAccess property is set to false) and is loaded in its own application domain, e.g., (Common Language Runtime, or CLR AppDomain), with its own access to global static variables and so forth; note that Silverlight™ contains its own mini-CLR 118. Without domain object model (DomBridge) access, the hosted application 111 does not have access to any other content on the page, including the page itself, or other plug-ins.

As also represented in FIG. 2 via steps 208 and 210, in addition to instancing and initializing the hidden plug-in 112 and loading the application 111, the XapHost element 114 directs input and layout notifications from the hosting application 104 to the hosted application 111. Further, the XapHost element 114 processes the output of the hosted application 111 so that that output can be composited by the hosting application's plug-in; (note that any other output such as audio and/or tactile output may be similarly mixed). Step 212 represents tearing down the hosted application at an appropriate time, e.g., upon shutdown or when the corresponding reference count on the XapHost element 114 goes to zero (e.g., when that part of the user interface is no longer to be rendered).

Figure 3:
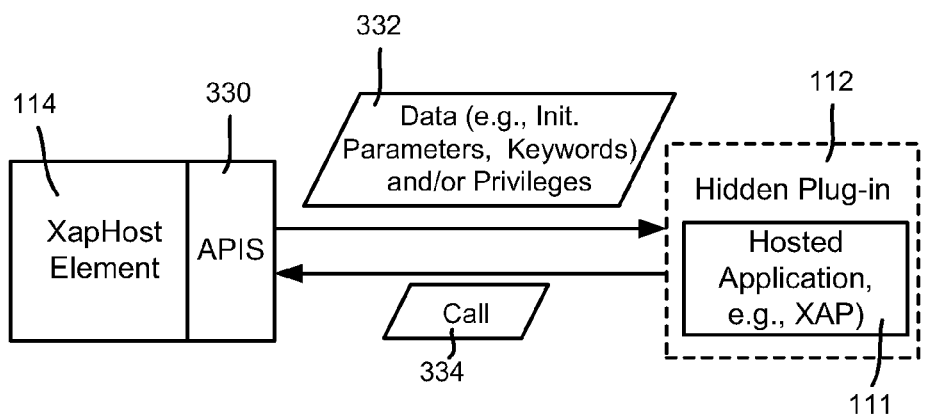
FIG. 3 is a block diagram showing example components for additional communication between a host application and an isolated plug-in application.

In one aspect, generally represented in FIG. 3, the XapHost element 114 may include one or more interfaces (e.g., APIs 330, among the other private APIs described above) that allow the host application 104 to communicate with the hosted application 111, such as to pass initialization parameters 332. For example, in an advertising scenario, initialization parameters may include a collection of keywords that are present on the hosting page, for which an advertisement application can serve relevant advertisements corresponding to one or more of the keywords.

In another aspect also generally represented in FIG. 3, via the APIs 330 the XapHost element 114 may allow the hosted application to perform certain privileged operations, (or perform the operations on its behalf upon an appropriate call 334). One example is to open a new browser window in response to a user-initiated action, such as to bring up a website corresponding to a clicked-on advertisement.

Another advantage is the ability to control power consumption. For example, advertisements may be a large source of power consumption in modern computer usage. With the plug-in hosting (e.g., XapHost) model, a reduced power mode may conserve power, such as by disabling animations and other power consuming operations.

Exemplary Operating Environment

Figure 4:
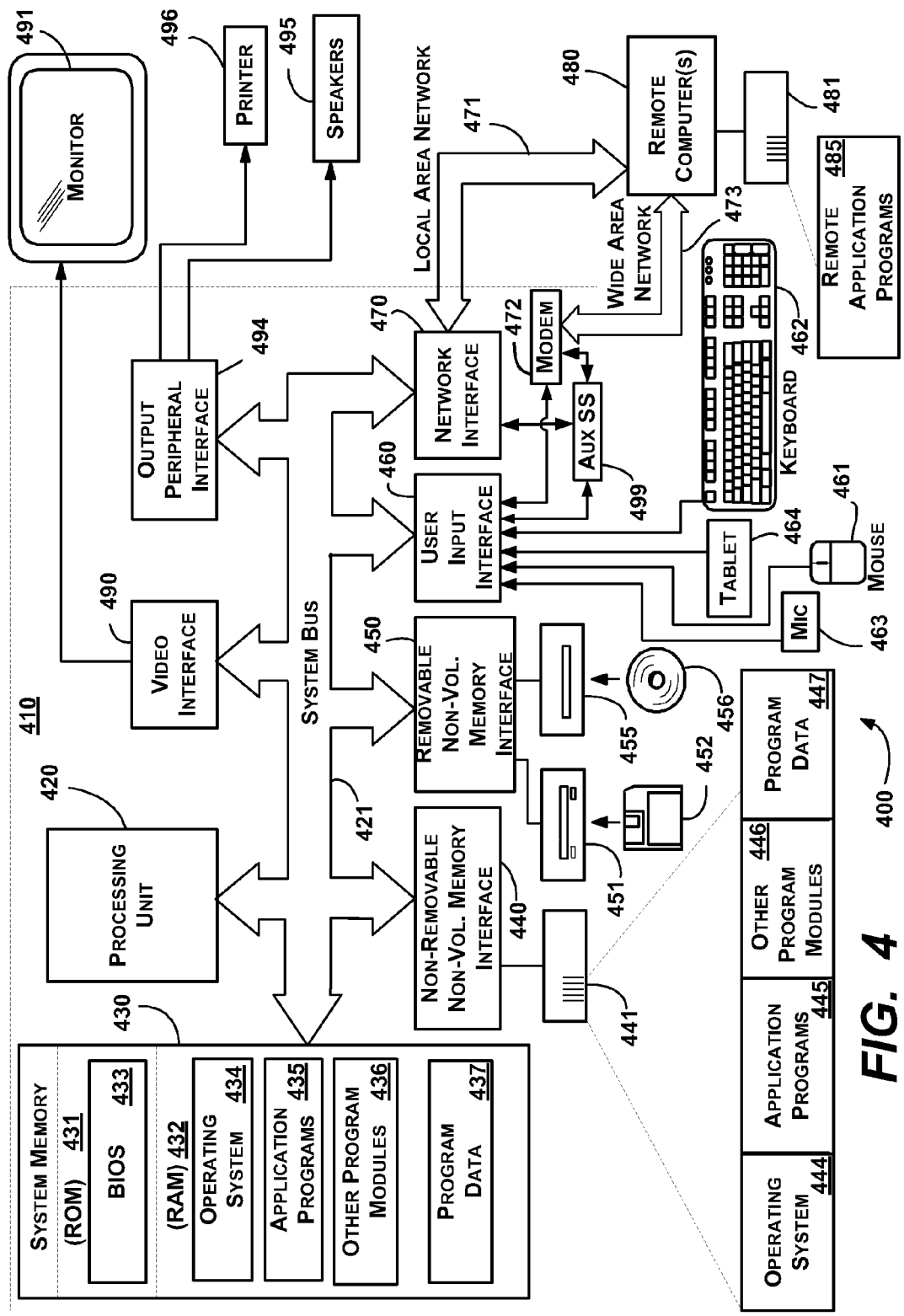
FIG. 4 shows an illustrative example of a computing environment into which various aspects of the present invention may be incorporated.

FIG. 4 illustrates an example of a suitable computing and networking environment 400 on which the examples of FIGS. 1-3 may be implemented. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment 400.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 4, an exemplary system for implementing various aspects of the invention may include a general purpose computing device in the form of a computer 410. Components of the computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 410 typically includes a variety of computer-readable media. Computer-readable media can be any available media that can be accessed by the computer 410 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 410. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436 and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media, described above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446 and program data 447. Note that these components can either be the same as or different from operating system 434, application programs 435, other program modules 436, and program data 437. Operating system 444, application programs 445, other program modules 446, and program data 447 are given different numbers herein to illustrate that, at a minimum, they are different copies. A user may enter commands and information into the computer 410 through input devices such as a tablet, or electronic digitizer, 464, a microphone 463, a keyboard 462 and pointing device 461, commonly referred to as mouse, trackball or touch pad. Other input devices not shown in FIG. 4 may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. The monitor 491 may also be integrated with a touch-screen panel or the like. Note that the monitor and/or touch screen panel can be physically coupled to a housing in which the computing device 410 is incorporated, such as in a tablet-type personal computer. In addition, computers such as the computing device 410 may also include other peripheral output devices such as speakers 495 and printer 496, which may be connected through an output peripheral interface 494 or the like.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include one or more local area networks (LAN) 471 and one or more wide area networks (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460 or other appropriate mechanism. A wireless networking component 474 such as comprising an interface and antenna may be coupled through a suitable device such as an access point or peer computer to a WAN or LAN. In a networked environment, program modules depicted relative to the computer 410, or portions thereof, may be stored in the remote memory storage device. By way of example, and not limitation, FIG. 4 illustrates remote application programs 485 as residing on memory device 481. It may be appreciated that the network connections shown are exemplary and other means of establishing a communications link between the computers may be used.

An auxiliary subsystem 499 (e.g., for auxiliary display of content) may be connected via the user interface 460 to allow data such as program content, system status and event notifications to be provided to the user, even if the main portions of the computer system are in a low power state. The auxiliary subsystem 499 may be connected to the modem 472 and/or network interface 470 to allow communication between these systems while the main processing unit 420 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents failing within the spirit and scope of the invention.

What is claimed is:

1. In a computing environment, a method comprising:
   loading a host application into a browser;
   presenting a hosted application within the host application that is running in the browser by instantiating a plug-in in a location that is hidden from the browser and loading the hosted application in the plug-in; and
   preventing the hosted application from accessing data of the browser, data of any other hosted application presented in the browser, and data from the host application by providing a tag element in a data structure corresponding to the host application that represents an isolation boundary in which to instantiate the plug-in within the host application.

2. The method of claim 1 wherein the tag element comprises one or more application programming interfaces that allow the host application to communicate with the hosted application.

3. The method of claim 1 wherein preventing the hosted application from accessing data further comprises:
   limiting the hosted application to providing output to the host application via the tag element; and
   disabling access of the hosted application to the data structure of the host application and a domain object model of the browser.

4. The method of claim 1 further comprising:
   tearing down the hosted application in response to the tag element indicating that a part of a user interface corresponding to the hosted application is no longer to be rendered.

5. The method of claim 1 wherein the tag element processes the output of the hosted application.

6. The method of claim 1 wherein hosting the hosted application further comprises:
   detecting when the tag element corresponding to the hosted application is programmatically added to a tree of the host application;
   instantiating a hidden instance of the plug-in; and
   loading the hosted application in the hidden instance of the plug-in.

7. The method of claim 1 further comprising:
   compositing output from the host application with output from the hosted application.

8. The method of claim 1 further comprising:
   communicating parameters from the host application to the hosted application via the tag element and controlling actions of the hosted application to control power consumption.

9. The method of claim 8 wherein communicating the parameters comprises providing information by which the hosted application can select at least one advertisement that is related to the host application and present the advertisement within the hosted application.

10. The method of claim 1 further comprising:
    allowing the hosted application to perform at least one privileged operation associated with the host application.

11. In a computing environment, a system comprising:
    at least one processor;
    a memory communicatively coupled to the at least one processor;
    a first plug-in executed by the at least one processor to run in a browser comprising a host application;
    a data structure associated with the first plug-in, the data structure including a tree of elements, the tree of elements including user interface elements of the first plug-in; and
    a second plug-in instantiated by the first plug-in within an isolation boundary that is hidden from the browser, the second plug-in having disabled access to browser elements, other browser-hosted application elements, and elements of the first plug-in, the second plug-in corresponding to a host element in the tree of elements, wherein the host element defines the isolation boundary, and wherein a hosted application is presented within the host application within the isolation boundary.

12. The system of claim 11 wherein the second plug-in is instantiated in response to the host element being added to the tree of elements.

13. The system of claim 11 wherein the first plug-in is associated with extensible application markup language (XAML) code, and wherein the second plug-in is instantiated when the host element corresponding to the second-plug-in is detected while parsing the XAML code.

14. The system of claim 11 wherein the host element identifies a source of the hosted application and a rendering area for the hosted application.

15. The system of claim 11 further comprising:
    one or more private application programming interfaces (APIs) associated with the first plug-in, wherein the second plug-in is instantiated by the first plug-in and communicates with the first plug-in via the private APIs.

16. The system of claim 15 wherein the first plug-in provides parameters to the second plug-in via the one or more private APIs.

17. The system of claim 11 wherein the first plug-in comprises a cross-browser cross-platform application, or wherein the second plug-in comprises the cross-browser cross-platform application, or wherein both the first plug-in comprises and the second plug-in comprises an instance of the cross-browser cross-platform application.

18. One or more computer storage media having computer-executable instructions stored thereon, which in response to execution by a computer, cause the computer to perform operations comprising:

running a first application as a first plug-in in a browser;

creating an element tree representing elements of the first application;

hosting a second application within the first plug-in, wherein hosting the second application includes:

containing a host element for the first plug-in in the element tree, instantiating a second plug-in that is hidden from the browser and disabled from accessing data of the browser, data of the first plug-in, and data of other browser-hosted application elements, and loading a second application to run in the second plug-in, the second application providing user interface elements via the host element to the first application; and rendering visible output by processing user interface elements of the first application and user interface elements of the second application.

19. The one or more computer storage media of claim 18 wherein the second application corresponds to an advertisement, and having further computer-executable instructions stored thereon, in response to execution by the computer, cause the computer to perform further operations comprising:

providing one or more keywords corresponding to page content in the browser to the second application via the host element such that the advertisement is related to the page content.

20. The one or more computer storage media of claim 18 having further computer-executable instructions stored thereon, in response to execution by the computer, cause the computer to perform further operations comprising:

allowing the second application to open a browser window to display website content.

* * * * *